(12) United States Patent
Kim

(10) Patent No.: US 9,503,226 B2
(45) Date of Patent: Nov. 22, 2016

(54) MANAGEMENT METHOD OF RETRANSMISSION TRAFFIC BURST

(71) Applicant: Electronics and Telecommunications Research Institute, Daejeon (KR)

(72) Inventor: Kyung Soo Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 51 days.

(21) Appl. No.: 14/592,332

(22) Filed: Jan. 8, 2015

(65) Prior Publication Data

US 2015/0215074 A1    Jul. 30, 2015

(30) Foreign Application Priority Data

Jan. 24, 2014   (KR) ........................ 10-2014-0008806

(51) Int. Cl.
*G08C 25/02* (2006.01)
*H04L 1/18* (2006.01)

(52) U.S. Cl.
CPC .................................. *H04L 1/1874* (2013.01)

(58) Field of Classification Search
CPC ....................................................... H04L 1/1874
See application file for complete search history.

(56) References Cited

U.S. PATENT DOCUMENTS

2010/0232437 A1* 9/2010 Bajpai ................... H04L 1/1628
                                                                370/400

FOREIGN PATENT DOCUMENTS

| KR | 10-2003-0060503 A | 7/2003 |
| KR | 10-2008-0052395 A | 6/2008 |
| KR | 10-2012-0070334 A | 6/2012 |

* cited by examiner

*Primary Examiner* — Sam Rizk
(74) *Attorney, Agent, or Firm* — Rabin & Berdo, P.C.

(57) ABSTRACT

Disclosed is a method for efficiently managing base station retransmission traffic of a portable Internet system, and more particularly, a management method of traffic burst retransmission that can minimize a time required to retransmit a traffic burst by enhancing a hash node connection structure of a hash table.

17 Claims, 3 Drawing Sheets

MANAGEMENT METHOD OF RETRANSMISSION TRAFFIC BURST

CROSS-REFERENCE TO RELATED APPLICATIONS

This application claims priority to and the benefit of Korean Patent Application No. 10-2014-0008806 filed in the Korean Intellectual Property Office on 24 Jan., 2014, the entire contents of which are incorporated herein by reference.

TECHNICAL FIELD

The present invention relates to a method for efficiently managing base station retransmission traffic of a portable Internet system, and more particularly, to a management method of traffic burst retransmission that can minimize a time required to retransmit a traffic burst by enhancing a hash node connection structure of a hash table.

BACKGROUND ART

In a portable Internet system such as a wireless broadband (WiBro), a hybrid auto repeat request (HARQ) scheme is used in order to increase transmission efficiency, that is, a transmission throughput in a wireless channel having a characteristic in which a channel state is very changeable and traffic channels for different types of services coexist.

A retransmission traffic burst means traffic transmitted to a terminal by retrieving the corresponding traffic burst in a base station when an error occurs in the transmitted traffic from the base station to the terminal. In the existing retransmission scheme, an alignment scheme is used in retrieving the retransmission traffic burst. That is, the related art uses is a method in which the base station sequentially stores the traffic bursts transmitted to the terminal in a retransmission traffic table through a simple alignment mode and sequentially retrieves the aligned traffic bursts when the retransmission is required, thereby finding the retransmission traffic burst.

However, since the retransmission traffic burst management method in the related art uses a scheme in which the number of traffic bursts and a retrieval time are in proportion to each other, a time required to retrieve the retransmission traffic burst increases as the number of retransmission traffic bursts increases, and as a result, a real-time service cannot be ensured.

PRIOR ART

[Patent Document] KR 2012-0070334

SUMMARY OF THE INVENTION

The present invention has been made in an effort to provide a method that can minimize a time required to retransmit a traffic burst by efficiently managing retransmission traffic bursts.

An exemplary embodiment of the present invention provides a management method of a retransmission traffic burst performed in a computer system for a portable Internet service, the method including: generating a first burst identifier for a transmitted traffic burst; acquiring a first hash table index by using the first burst identifier; connecting a hash node to the first hash table index of a hash table; and inserting the first burst identifier into the hash node connected to the hash table and storing the traffic burst in a memory storage space assigned to the hash node.

The management method of the retransmission traffic burst may further include: generating a second burst identifier for a specific traffic burst when a retransmission request for the specific traffic burst is made; acquiring a second hash table index by using the second burst identifier; retrieving a hash node having the same burst identifier as the second burst identifier among hash nodes connected to the second hash table index in the hash table; and reading a traffic burst from a memory storage space assigned to the hash node having the same burst identifier as the second burst identifier.

According to an exemplary embodiment of the present invention, a time required to manage retransmission traffic bursts is minimized by retrieving retransmission traffic in real time to enable a portable Internet service in real time.

Figure 1:
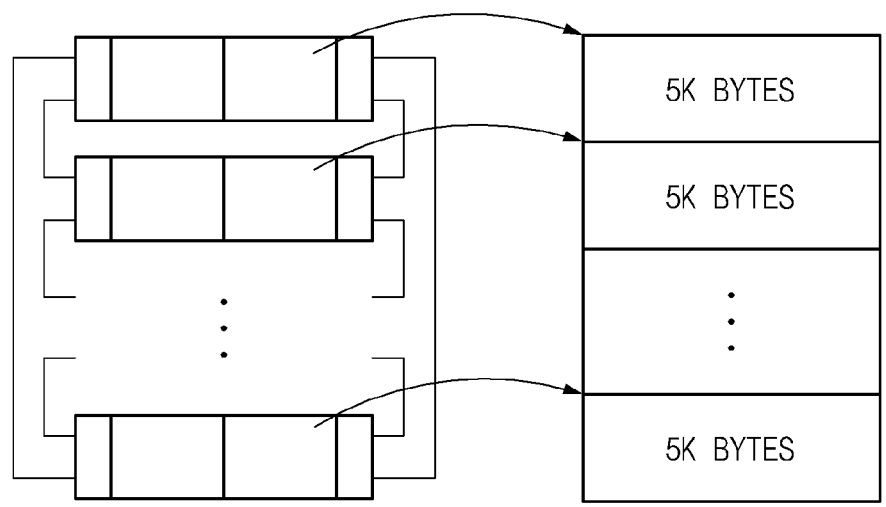
FIG. 1 is a diagram illustrating a state in which candidate hash nodes are listed and connected according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in more detail with reference to the accompanying drawings. Prior to this, terms or words used in the present specification and claims should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner. Therefore, configurations illustrated in the embodiments and the drawings described in the present specification are only the most preferred embodiment of the present invention and do not represent all of the technical spirit of the present invention, and thus it is to be understood that various equivalents and modified examples, which may replace the configurations, are possible when filing the present application.

Figure 2:
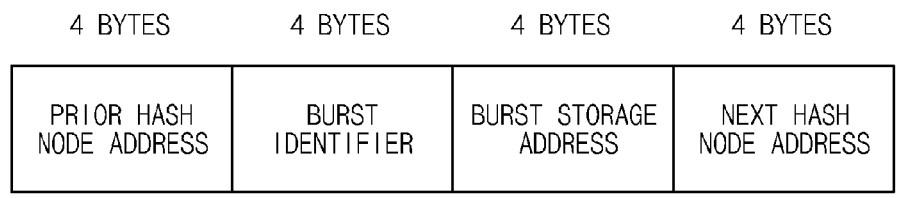
FIG. 2 is a diagram illustrating a configuration of each candidate hash node of FIG. 1.

FIG. 1 is a diagram illustrating a state in which candidate hash nodes are listed and connected according to an exemplary embodiment of the present invention. FIG. 2 is a diagram illustrating a configuration of each candidate hash node of FIG. 1.

In the exemplary embodiment, a predetermined number of candidate hash nodes, which are to be used as a hash node for retrieving a traffic burst to be retransmitted, are, in advance, configured in a list form. Further, a memory space in which the traffic burst is to actually be stored is, in advance, fixedly assigned to each candidate hash node. In this case, the number of the candidate hash nodes may be designated as the number of traffics which may be housed in a system or a predetermined number may be designated as a default value.

The candidate hash nodes have a circulation structure in which a first candidate hash node and a last candidate hash node are connected like a closed loop, and adjacent candidate hash nodes have a dual connection list structure in which the adjacent candidate hash nodes have address information indicating each to be dually connected.

Each candidate hash node of the candidate hash node connection list includes a field in which a previous hash node address is to be stored, a field in which a burst identifier is to be stored, a field in which a burst storage address is to be stored, and a field in which a next hash node address is to be stored, and each field may be assigned with 4 bytes.

The structure of the hash node may be represented by Table 1.

TABLE 1

```
struct hashNode_tag {
    int burstId;
    int *burstAdd_p;
    struct hashNode_tag  *prev_p;
    struct hashNode_tag  *next_p;
};
```

The previous hash node address is an address indicating a hash node connected immediately prior thereto when the hash nodes are connected to a hash table to be described below, and the next hash node address is an address indicating a hash node connected immediately next thereto. As such, the hash nodes have the previous hash node address and the next hash node address to have a dual connection structure in which two hash nodes connected to be adjacent to each other indicate each other.

The burst storage address indicates an address of the memory space in which the traffic burst is to be actually stored. In this case, the memory space in which the traffic burst is actually stored has a size (for example, 5 k bytes) capable of sufficiently storing the traffic burst and is, in advance, fixedly assigned for each candidate hash node.

The burst identifier ID is information for identifying an address (hash table index) in which the candidate hash node is to be connected in the hash table and identifying a hash node into which information on a traffic burst desired to be found among hash nodes connected to the hash table is inserted. The burst identifier may be generated by using a 15-bit terminal identifier and a 4-bit channel identifier included in the traffic burst. That is, the burst identifier may be generated by modulating a terminal identifier and a channel identifier in the related art. In this case, a modulation method for generating the burst identifier may adopt any method.

Figure 3:
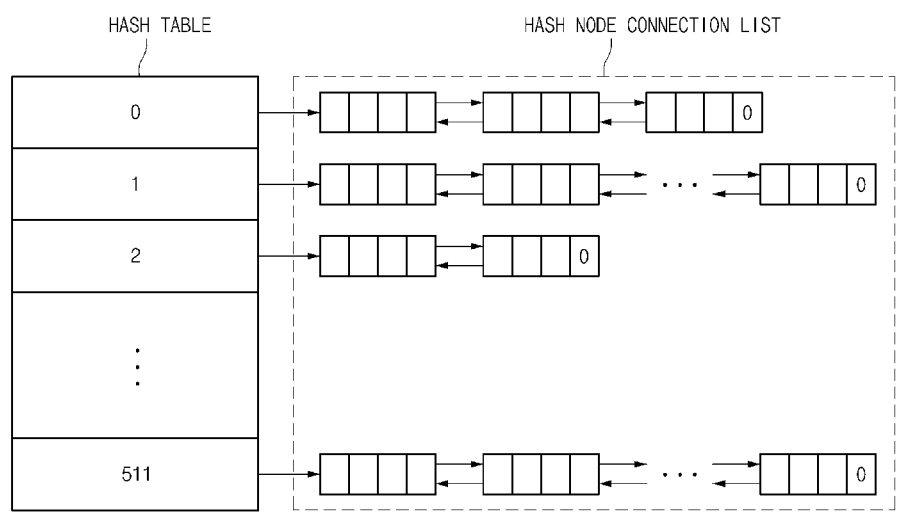
FIG. 3 is a diagram conceptually illustrating a state in which hash nodes are connected to a hash table according to an exemplary embodiment of the present invention.

FIG. 3 is a diagram conceptually illustrating a state in which hash nodes are listed in and connected to a hash table according to an exemplary embodiment of the present invention.

The hash table has a structure in which connection start addresses (hash table indexes) which become a connection reference of the hash nodes are arranged in sequence. In FIG. 3, 512 hash table indexes of 0 to 511 are sequentially arranged, but the number of the hash table indexes is not limited thereto.

The hash nodes are connected to the respective indexes (hash table indexes) (0 to 511) of the hash table to configure the hash node connection list, and identification information (burst identifier) on the traffic burst and information (burst storage address) indicating a position (memory space) in which the corresponding traffic burst is actually stored are stored in each hash node. The hash node is inserted with information on the corresponding traffic burst after the candidate hash node in the candidate hash node connection list of FIG. 2 is connected to the hash table index. In this case, it is determined to which index of the hash table the candidate hash node is connected according to the burst identifier of the corresponding traffic burst. That is, the hash node connection list of the exemplary embodiment does not have a structure in which all hash nodes are arranged in series, but a plurality of (512 in FIG. 3) hash table indexes is configured in the hash table and thereafter, the hash nodes are sequentially connected to the hash table index to which the hash nodes belong according to the burst identifier. In this case, by a method for determining the hash table index to be connected with the candidate hash node, when a burst identifier value of the corresponding traffic burst is divided by the number of (512 in FIG. 3) of hash table indexes, a remaining value may be set as the hash table index.

Adjacent hash nodes in the hash nodes connected to each index of the hash table have the dual connection structure. That is, the hash nodes have an address indicating a hash node connected immediately next thereto and an address indicating a hash node connected immediately prior thereto to have the dual connection structure in which the hash nodes indicate each other. In this case, a field value of the next hash node address of a hash node connected last in a connection list for each hash table index becomes NULL ("0").

When any one of the hash nodes connected to the hash table index is removed from the connection structure, for example, when an ACK signal is normally received from a terminal, and as a result, the corresponding traffic burst need not be managed as the retransmission traffic burst, a retransmission traffic burst management apparatus connects the hash nodes immediately prior and immediately next to the corresponding hash node by using the prior hash node address and the next hash node address of the corresponding hash node, and modifies the prior hash node address and the next hash node address of the newly connected hash nodes according to a connection relationship. The hash node removed from the hash node connection list is included in the candidate hash node connection list again.

Figure 4:
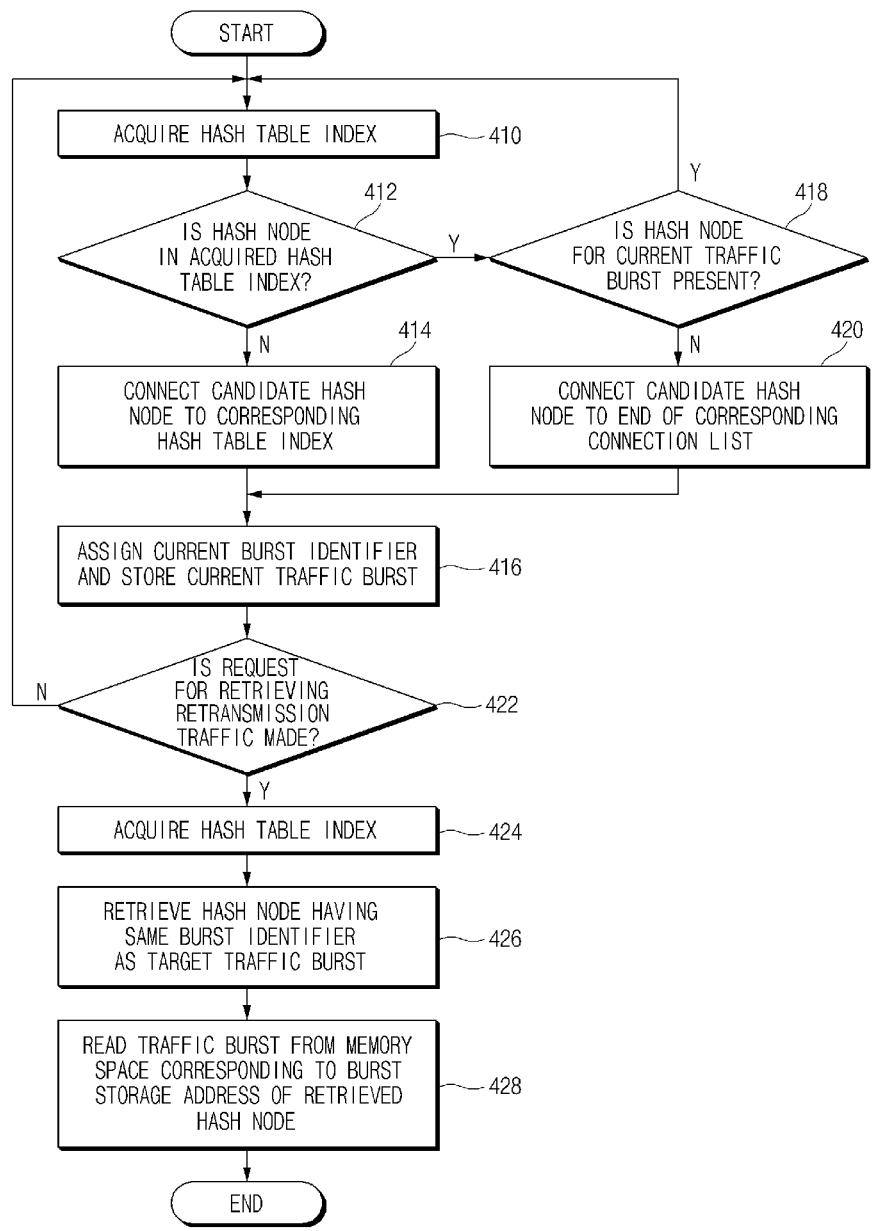
FIG. 4 is a flowchart for describing a management method of a retransmission traffic burst according to an exemplary embodiment of the present invention.

FIG. 4 is a flowchart for describing a management method of a retransmission traffic burst according to an exemplary embodiment of the present invention. The management method of the retransmission traffic burst is performed in a computer system for providing the portable Internet service.

When the traffic burst is transmitted from a base station to a terminal, the retransmission traffic burst management apparatus of the base station manages the corresponding traffic burst (hereinafter, referred to as a 'current traffic burst') as the retransmission traffic burst before an ACK signal for the transmitted traffic burst is received.

To this end, the retransmission traffic burst management apparatus first acquires the hash table index by using a burst identifier of the current traffic burst (step 410).

For example, the retransmission traffic burst management apparatus generates the burst identifier (hereinafter, referred to as the 'current burst identifier') by modulating the 15-bit terminal identifier and the 4-bit channel identifier included in the current traffic burst by using a predetermined method. Next, the retransmission traffic burst management apparatus divides a value of the current burst identifier by the number of all indexes included in the hash table and thereafter, sets a remaining value as the hash table index. When the hash table is used as illustrated in FIG. 3, the retransmission traffic burst management apparatus divides the value of the current burst identifier by 512 and thereafter, sets a remaining value (one of 0 to 511) as a hash table index desired to be acquired.

When the hash table index is acquired, the retransmission traffic burst management apparatus finds the corresponding hash table index in the hash table and thereafter, verifies whether the hash node already connected to the corresponding hash table index is present (step 412).

When no hash node is connected to the corresponding hash table index, the retransmission traffic burst management apparatus acquires one candidate hash node in the candidate hash node connection list of FIG. 1 and thereafter, connects the acquired candidate hash node to the hash table index acquired in step 410 in the hash table (step 414).

Next, the retransmission traffic burst management apparatus assigns the 'current burst identifier' to the burst identifier field of the connected candidate hash node and stores the current traffic burst in a memory space previously assigned to the burst storage address field (step 416).

In addition, the retransmission traffic burst management apparatus initializes the prior hash node address and the next hash node address of the corresponding candidate hash node to NULL.

As described in FIG. 1, a space which is, in advance, fixedly assigned for each candidate hash node is present in a memory device, and information on the memory space is recorded in the burst storage address field of each candidate hash node. Accordingly, the retransmission traffic burst management apparatus may store the retransmission traffic burst in a burst storage address previously assigned to the burst storage address field of the corresponding candidate hash node.

When there are the hash nodes that are already connected to the hash table index acquired in step 412, the retransmission traffic burst management apparatus verifies whether the hash node for the current traffic burst is already present among the connected hash nodes (step 418).

That is, the retransmission traffic burst management apparatus compares the burst identifier of each hash node and the current burst identifier while sequentially retrieving the hash nodes in the corresponding hash node connection list by using the next hash node address of the hash node, thereby verifying whether a hash node having the same burst identifier as the current burst identifier is present.

In this case, when the hash node having the same burst identifier as the current burst identifier is already present, the retransmission traffic burst management apparatus stops connection of the current traffic burst.

However, when a last hash node is retrieved, even if the hash node having the same burst identifier as the current burst identifier is not present, the retransmission traffic burst management apparatus acquires one candidate hash node in the candidate hash node connection list and thereafter, connects the corresponding candidate hash node to the end of the corresponding hash node connection list (step 420).

That is, the retransmission traffic burst management apparatus connects the candidate hash node to the next of the hash node which is the last hash node in the corresponding hash node connection list.

Next, the retransmission traffic burst management apparatus assigns the 'current burst identifier' to the burst identifier field of the connected candidate hash node, and stores the current traffic burst in a memory space previously assigned to the burst storage address field (step 416).

The retransmission traffic burst management apparatus determines a next hash node address of the last hash node in the hash node connection list as an address of a newly connected candidate hash node. Further, the retransmission traffic burst management apparatus determines an address of a hash node prior to the newly connected hash node as the address of the last hash node in the hash node connection list, and initializes a next hash node address to NULL.

Next, when a retransmission request for a specific traffic burst is made (step 422), the retransmission traffic burst management apparatus acquires the hash table index by using a burst identifier of a traffic burst (hereinafter, referred to as a 'target traffic burst') to be first retransmitted (step 424).

That is, the retransmission traffic burst management apparatus acquires the hash table index for the target traffic burst by the same method as in step 410.

Next, the retransmission traffic burst management apparatus finds a hash node having the same burst identifier as the burst identifier of the target traffic burst by sequentially retrieving hash nodes connected to the acquired hash table index (step 426).

When the corresponding hash node is retrieved, the retransmission traffic burst management apparatus reads the target traffic burst in a memory storage space corresponding to an address value of a burst storage address field of the retrieved hash node (step 428).

As described above, according to the present exemplary embodiment, unlike the related art, a connection list to which the target traffic burst belongs is first found by using the hash table index without sequentially retrieving all hash nodes, and thereafter, a desired retransmission traffic burst is found by retrieving only hash nodes in the corresponding connection list, thereby minimizing a time required to retrieve a desired retransmission traffic time.

The exemplary embodiments of the present invention are illustrative only, and various modifications, changes, substitutions, and additions may be made without departing from the technical spirit and range of the appended claims by those skilled in the art, and it will be appreciated that the modifications and changes are included in the appended claims.

What is claimed is:

1. A management method of a retransmission traffic burst performed in a computer system for a portable Internet service, the method comprising:
generating a first burst identifier for a transmitted traffic burst;
acquiring a first hash table index by using the first burst identifier;
selecting a hash node from among a list of candidate hash nodes that has a circulation structure, in which adjacent candidate hash nodes are dually connected, and first and last candidate hash nodes are connected so that the list forms a closed loop;
connecting the hash node to the first hash table index of a hash table; and inserting the first burst identifier into the hash node connected to the hash table and storing the traffic burst in a memory storage space assigned to the hash node.

2. The method of claim 1, wherein in the generating of the first burst identifier, a terminal identifier and a channel identifier of the traffic burst are modulated.

3. The method of claim 2, wherein in the acquiring of the first hash table index, a value of the first burst identifier is divided by the number of all hash table indexes included in the hash table and thereafter, a remaining value is acquired.

4. The method of claim 3, wherein in the connecting of the hash node to the first hash table index, the hash node is connected to a hash table index corresponding to the remaining value among a plurality of hash table indexes included in the hash table.

5. The method of claim 1, wherein in the acquiring of the first hash table index, a value of the first burst identifier is divided by the number of all hash table indexes included in the hash table and thereafter, a remaining value is acquired.

6. The method of claim 5, wherein in the connecting of the hash node to the first hash table index, the hash node is connected to a hash table index corresponding to the remaining value among a plurality of hash table indexes included in the hash table.

7. The method of claim 1, wherein in the connecting of the hash node to the first hash table index, one among the candidate hash nodes to which the memory storage space is fixedly assigned is connected to the first hash table index.

8. The method of claim 1, wherein the connecting of the hash node to the first hash table index includes:
verifying whether hash nodes which are already connected to the first hash table index are present; and
connecting the hash node to the first hash table index when there is no already connected hash node.

9. The method of claim 8, further comprising
initializing an address of a hash node next to the connected hash node to NULL.

10. The method of claim 8, further comprising:
verifying whether a hash node having the same burst identifier as the first burst identifier is present in the connected hash node when there is an already connected hash node; and
connecting the hash node next to the last hash node among the already connected hash nodes when there is no hash node having the same burst identifier.

11. The method of claim 10, further comprising:
setting the address of the hash node next to the last hash node among the already connected hash nodes as an address of the selected candidate hash node, setting an address of a hash node prior to the selected candidate hash node as an address of the last hash node, and initializing an address of the hash node next to the selected candidate hash node to NULL.

12. The method of claim 1, wherein the hash node includes a prior hash node address field storing an address indicating a hash node connected immediately prior thereto, a burst identifier field storing the burst identifier, a burst storage address field storing an address of a memory storage space actually storing the traffic burst, and a next hash node address field storing an address of a hash node connected immediately next thereto.

13. The method of claim 12, wherein the address of the memory storage space is an address which is, in advance, fixedly assigned to each hash node.

14. The method of claim 1, further comprising:
generating a second burst identifier for a specific traffic burst when a retransmission request for the specific traffic burst is made;
acquiring a second hash table index by using the second burst identifier;
retrieving a hash node having the same burst identifier as the second burst identifier among hash nodes connected to the second hash table index in the hash table; and
reading a traffic burst from a memory storage space assigned to the hash node having the same burst identifier as the second burst identifier.

15. The method of claim 14, wherein in the generating of the second burst identifier, a terminal identifier and a channel identifier of the specific traffic burst are modulated.

16. The method of claim 15, wherein in the acquiring of the second hash table index, a value of the second burst identifier is divided by the number of all hash table indexes included in the hash table and thereafter, a remaining value is acquired.

17. The method of claim 14, wherein in the acquiring of the second hash table index, a value of the second burst identifier is divided by the number of all hash table indexes included in the hash table and thereafter, a remaining value is acquired.

* * * * *